United States Patent
Nelkenbaum

(10) Patent No.: US 8,532,616 B2
(45) Date of Patent: Sep. 10, 2013

(54) SYSTEMS AND METHODS FOR IDENTIFICATION OF MOBILE PHONES IN A RESTRICTED ENVIRONMENT

(75) Inventor: Yossi Nelkenbaum, Ramat-Gan (IL)

(73) Assignee: Verint Americas, Inc., Alpharetta, GA (US)

( * ) Notice: Subject to any disclaimer, the term of this patent is extended or adjusted under 35 U.S.C. 154(b) by 56 days.

(21) Appl. No.: 13/096,153

(22) Filed: Apr. 28, 2011

(65) Prior Publication Data
US 2011/0319010 A1    Dec. 29, 2011

(30) Foreign Application Priority Data
Apr. 29, 2010 (IL) .......... 205450

(51) Int. Cl.
H04M 1/66 (2006.01)
H04M 1/68 (2006.01)
H04M 3/16 (2006.01)
H04W 36/00 (2009.01)
H04W 88/02 (2009.01)
H04W 12/12 (2009.01)

(52) U.S. Cl.
CPC .......... *H04W 12/12* (2013.01); *H04M 3/16* (2013.01); *H04M 1/68* (2013.01); *H04W 88/02* (2013.01)
USPC .......... 455/410; 455/436; 455/461

(58) Field of Classification Search
USPC .......... 455/410, 436, 461
See application file for complete search history.

(56) References Cited

U.S. PATENT DOCUMENTS
8,233,880 B2 * 7/2012 Johnson .......... 455/410
2004/0203780 A1 * 10/2004 Julka et al. .......... 455/436
2005/0136949 A1 * 6/2005 Barnes, Jr. .......... 455/461

FOREIGN PATENT DOCUMENTS
WO    2010116292 A2    10/2010

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.
Asokan, N., et al., "Man-in-the-Middle in Tunneled Authentication Protocols," Draft version 1.3 (latest public version: http://eprint.iacr.org/2002/163/, Nov. 11, 2002, 15 pages.
Meyer, Ulrike, et al., "On the Impact of GSM Encryption and Man-in-the-Middle Attacks on the Security of Interoperating GSM/UMTS Networks," IEEE, 2004, 8 pages.

* cited by examiner

*Primary Examiner* — William D Cumming
(74) *Attorney, Agent, or Firm* — Meunier Carlin & Curfman

(57) ABSTRACT

Methods and systems for identifying mobile communication terminals that are used in an unauthorized manner in a restricted environment. A monitoring system monitors mobile communication terminals that operate in the vicinity of a restricted environment, such as a prison. A profiling system analyzes the communication of the solicited terminals, and produces respective activity profiles of the terminals. Based on the activity profiles, the profiling system identifies communication terminals that are operated illegitimately. Various actions can be taken with respect to such illegitimate terminals. In a prison application, the profiling system identifies communication terminals that are operated illegitimately by prisoners.

17 Claims, 2 Drawing Sheets

SYSTEMS AND METHODS FOR IDENTIFICATION OF MOBILE PHONES IN A RESTRICTED ENVIRONMENT

FIELD OF THE DISCLOSURE

The present disclosure relates generally to communication, and particularly to methods and systems for identifying mobile communication terminals in a restricted environment.

BACKGROUND OF THE DISCLOSURE

Various environments impose restrictions on the use of mobile communication terminals. For example, in a prison environment, prisoners are typically not permitted to hold or use mobile phones. Prison authorities invest considerable effort in preventing mobile phones from being smuggled into prisons and used by prisoners.

SUMMARY OF THE DISCLOSURE

An embodiment that is described herein provides a method, including:
 monitoring mobile communication terminals, which are located in a vicinity of a restricted environment;
 producing respective activity profiles of the monitored communication terminals; and
 based on the activity profiles, identifying a communication terminal that is operated illegitimately in the restricted environment.

In some embodiments, monitoring the communication terminals includes operating a dummy communication network, including one or more base stations, in the vicinity of the restricted environment, and soliciting the communication terminals to communicate with the dummy communication network. In alternative embodiments, monitoring the communication terminals includes interfacing with a public communication network over which the communication terminals communicate. In some embodiments, the restricted environment includes a prison, and the identified communication terminal is operated illegitimately by a prisoner. In an embodiment, the method includes controlling communication with the identified communication terminal.

Identifying the communication terminal may include classifying at least some of the monitored communication terminals to a first class of illegitimately-operated communication terminals, a second class of legitimately-operated communication terminals belonging to staff of the restricted environment, and a third class of legitimately-operated communication terminals that do not belong to the staff. In a disclosed embodiment, classifying the monitored communication terminals includes associating a given monitored communication terminal with one of the classes, and controlling communication with the given communication terminal based on a class with which it is associated.

In an embodiment, controlling the communication includes blocking the communication when the given communication terminal is associated with the first class, and allowing the communication when the given communication terminal is associated with one of the second and third classes. In another embodiment, controlling the communication includes providing a private network service to the given communication terminal when the given communication terminal is associated with the second class.

In some embodiments, identifying the communication terminal includes applying an identification criterion to an activity profile of the communication terminal, and identifying the communication terminal as operating illegitimately responsively to meeting the criterion. In an embodiment, monitoring the communication terminals includes operating a dummy communication network in the vicinity of the restricted environment and soliciting the communication terminals to communicate with the dummy communication network, and the identification criterion regards the communication terminal as legitimate when the communication terminal is handed-off to the dummy communication network from another network, and as illegitimate when the communication terminal is switched-on in the dummy communication network.

Additionally or alternatively, the identification criterion regards the communication terminal as illegitimate when the communication terminal communicates in a repetitive pattern. In a disclosed embodiment, the method includes accepting feedback, which indicates whether the identified communication terminal is illegitimate, and adapting the identification criterion responsively to the feedback.

In some embodiments, identifying the communication terminal includes holding at least one list selected from a group of lists consisting of a white list containing communication terminals that are known to be legitimately-operated and a black list containing communication terminals that are known to be illegitimately-operated, and identifying the communication terminal using the at least one list. In an embodiment, identifying the communication terminal includes applying an identification criterion to an activity profile of the communication terminal, and the method includes automatically adapting the criterion by using the at least one list as a training set.

There is additionally provided, in accordance with an embodiment that is described herein, apparatus, including:
 an interface, which is configured to communicate with a communication network so as to monitor mobile communication terminals that communicate over the communication network and are located in a vicinity of a restricted environment; and
 a processor, which is configured to receive information regarding the monitored communication terminals from the communication network via the interface, to produce respective activity profiles of the monitored communication terminals using the information, and to identify, based on the activity profiles, a communication terminal that is operated illegitimately in the restricted environment.

The present disclosure will be more fully understood from the following detailed description of the embodiments thereof, taken together with the drawings in which:

DETAILED DESCRIPTION OF EMBODIMENTS

Overview

Figure 1:
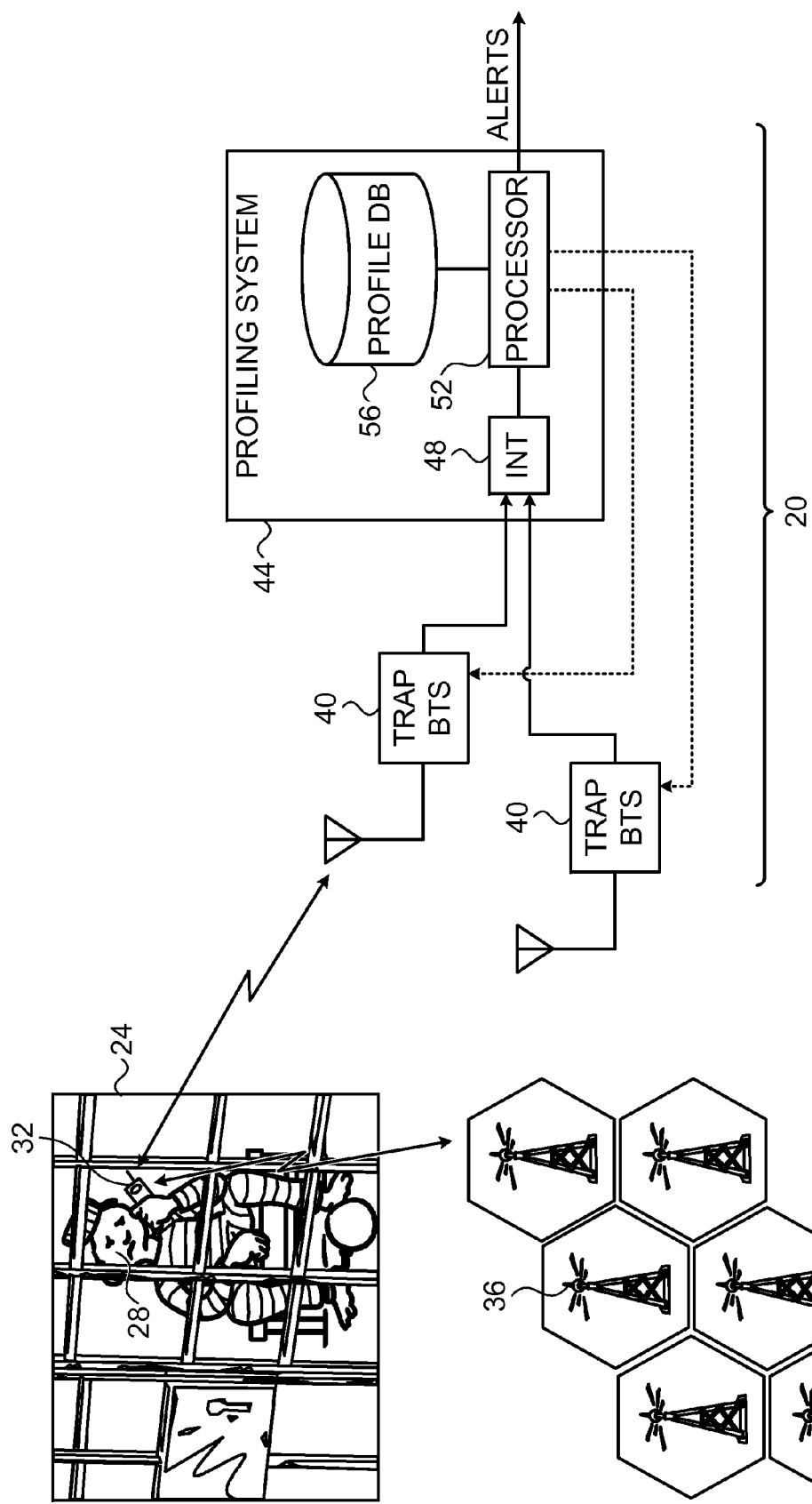
FIG. 1 is a block diagram that schematically illustrates a system for identifying mobile communication terminals in a prison environment, in accordance with an embodiment of the present disclosure.

Embodiments that are described hereinbelow provide methods and systems for identifying mobile communication terminals that are used in an unauthorized manner in a restricted environment. In particular, the embodiments described herein address the problem of identifying mobile phones that are used illegitimately by prisoners in a prison environment. The disclosed techniques, however, can also be used for identifying other sorts of unauthorized use of communication terminals in other restricted environments.

In some embodiments, a monitoring system monitors mobile communication terminals that operate in the vicinity of a restricted environment, such as a prison. A profiling system analyzes the communication of the solicited terminals, and produces respective activity profiles of the terminals. Based on the activity profiles, the profiling system identifies communication terminals that are operated illegitimately. Various actions can be taken with respect to such illegitimate terminals. In a prison application, the profiling system identifies communication terminals that are operated illegitimately by prisoners.

In some embodiments, the communication terminals are monitored by operating a dummy communication network, comprising one or more base stations, which solicits communication terminals in the vicinity of the restricted environment to communicate with the dummy network. In alternative embodiments, the communication terminals are monitored by interfacing with a public communication network over which the terminals communicate.

In some embodiments, the profiling system uses the activity profiles to distinguish between illegitimate and legitimate terminals, even when both types of terminals operate in the same geographical area. In a prison environment, legitimate terminals may comprise, for example, phones operated by visitors, prison staff, or ordinary subscribers that are geographically close to the prison.

The profiling system may apply various criteria to differentiate between legitimate and illegitimate communication terminals. In a prison environment, for example, a mobile phone that is handed-off to the dummy network from a neighboring public network is likely to be innocent. A phone that switches on and initially registers with the dummy network, on the other hand, is typically suspected of being illegitimate. Such a phone is especially suspicious if the switch-on events occur multiple times. Repetitive behavior, such as a phone that switches on at regular hours every day, may also be suspected of being illegitimate.

Using criteria of this sort, the profiling system is able to classify the solicited communication terminals as illegitimate, innocent, or innocent and belonging to prison staff. The profiling system can control the communication with a given terminal based on this classification. For example, innocent terminals can be handed-off to the public network and allowed to continue communicating. Illegitimate terminals can be retained in the dummy network and blocked or eavesdropped. Terminals operated by prison staff can be provided with private network services.

The methods and systems described herein identify illegitimate communication terminals based on activity profiling, and not based only on geographical location. These methods and systems are selective and do not affect innocent terminals that are present in the vicinity of the restricted environment. As such, the disclosed techniques are particularly suitable for restricted environments (e.g., prisons) that are located in close proximity to residential areas, or environments having large numbers of innocent or authorized individuals. Moreover, the disclosed techniques do not merely block communication, but rather enable a much broader range of possible actions based on terminal classification.

System Description

FIG. 1 is a block diagram that schematically illustrates a system 20 for identifying mobile communication terminals in a prison environment, in accordance with an embodiment of the present disclosure. As noted above, although the embodiments described herein address prison environments, the disclosed techniques can be applied in any other suitable restricted environment.

System 20 is operated in the vicinity of a prison 24, in order to prevent prisoners 28 from illegitimately using mobile communication terminals 32, such as cellular phones. In a typical scenario, a prisoner 28 attempts to operate an illegally-held communication terminal 32 in order to communicate with a public communication network 36, in the present example a cellular network. System 20 identifies such attempts, while distinguishing between legitimate and illegitimate communication terminals, using methods that are described below.

Terminals 32 may comprise any suitable type of communication terminal, such as cellular phones. Network 36 may comprise, for example, a Global System for Mobile telecommunication (GSM) network, a Universal Mobile Telecommunication System (UMTS) network, a Code-Division Multiple Access (CDMA) network, an iDEN network, a WiMAX (IEEE 802.16) network, a Long-Term Evolution (LTE) network, or any other suitable type of communication network.

System 20 comprises a dummy communication network, which comprises one or more trap base stations 40 (also referred to as trap Base Transceiver Stations-BTSs). The trap BTSs solicit terminals 32 to communicate with the dummy network, by imitating the operation of a legitimate base station. A trap BTS may solicit a terminal to communicate in various ways, which may depend on the wireless protocol or protocols, supported by the terminal and the trap BTS. In GSM networks, for example, the terminal measures the signals transmitted by BTSs that are within range, and maintains a list of BTSs that are candidates for hand-off. The terminal may decide to switch from its current serving BTS (a BTS in network 36) to another BTS (another BTS in network 36 or a trap BTS 40) based on various criteria, such as based on signal strength or on predefined priorities assigned to the BTSs.

In some embodiments, trap BTS 40 may solicit terminal 32 by transmitting at a high power level and/or using directional antennas, so that the trap BTS's transmission will be received by the terminal at a signal strength that is stronger than the BTSs of network 36. In such cases, the target terminal is likely to attempt reselection to the trap BTS. In alternative embodiments, the different BTSs are assigned priorities, and the target terminal chooses the serving BTS in accordance with their priorities. In these embodiments, the trap BTS may be configured to imitate a high-priority BTS with respect to the BTSs of network 36 in order to solicit the target terminal.

Having solicited a given terminal to communicate, the trap BTS sends information regarding their communication with the solicited terminal to a profiling system 44. Such information may comprise, for example, the International Mobile Subscriber Identity (IMSI) and/or International Mobile Equipment Identity (IMEI) of the terminal, a time stamp indicating the time at which communication took place, and/or any other suitable information. The profiling system analyzes the information provided by trap BTSs 40, in order to identify communication terminals that are operated illegitimately by prisoners.

Each trap BTS typically comprises an antenna for communicating with terminals 24, a transmitter (TX) for transmitting to the terminals, a receiver (RX) for receiving transmissions from the terminals, and a BTS processor for carrying out the different processing functions of the trap BTS. For example, the BTS processor manages the communication establishment with the trapped terminals using the TX and RX, displays information to a local operator using a suitable display, and accepts input from the local operator via a suitable input device (e.g., a keyboard or mouse). The trap BTS typically comprises a network interface, via which the trap BTS communicates with profiling system 44. (The internal trap BTS structure is not shown in the figure.)

Profiling system 44 comprises an interface 48 for communicating with trap BTSs 40, and a processor 52 that carries out the methods described herein. In some embodiments, profiling system 44 comprises a profile database 56, which holds activity profiles of respective terminals 32. The activity profiles are produced by processor 52, and are used by the processor to identify illegitimate terminals. The profile database can be stored in any suitable memory, such as on a magnetic disk or other storage device. Upon identifying an illegitimate communication terminal, processor 52 may issue an alert to an operator. Additionally or alternatively, processor may control the communication of the dummy network with the identified terminal. Several examples of profiling techniques and responsive actions are described further below.

The system configuration shown in FIG. 1 is an example configuration, which is chosen purely for the sake of conceptual clarity. In alternative embodiments, any other suitable system configuration can also be used. For example, system 20 may comprise a single trap BTS or more than two trap BTSs. In some embodiments, processor comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Identification of Illegitimate Communication Terminals Based on Activity Profiling In some embodiments, processor 52 produces activity profiles of communication terminals that communicate with trap BTSs 40. The activity profiles comprise information, which is provided by trap BTSs 40 and enables processor 52 to identify communication terminals that are operated illegitimately by prisoners. In some embodiments, processor 52 applies certain criteria to the activity profiles, in order to identify illegitimately-operated terminals.

For example, the activity profile of a given terminal may indicate, for each communication session with the trap BTSs, whether the terminal was handed-off to the dummy network from a neighboring public network, or whether it has initially switched-on in the dummy network. An example criterion may regard a phone that is switched-on in the dummy network as suspicious, and a phone that is handed-off from another network as innocent. Typically, the criterion considers multiple events rather than a single event. In other words, a single switch-on event in the dummy network may not be regarded as suspicious. Multiple switch-on events in the dummy network, on the other hand, will typically cause processor 52 to regard the terminal as possibly illegitimate. Additionally, the criterion may regard a phone that switches on periodically at regular hours as especially suspicious.

Other criteria may regard other kinds of repetitive activity of a terminal as potentially indicating an illegitimate terminal. For example, a phone that conducts calls at regular hours may be regarded as suspicious. In some embodiments, the criterion may correlate the activity times of the terminals with the periodic (e.g., daily) routine of the prison. For example, a phone that conducts calls only during times at which the prisoners are confined to their cells may be regarded as suspicious. As yet another example, the mere presence of a particular terminal in the vicinity of the prison for a long period of time may be regarded as suspicious.

In some embodiments, processor 52 may detect that a particular terminal in the prison environment operates using different Subscriber Identity Modules (SIM) at different times. This sort of behavior may also be regarded as suspicious and indicative of an illegitimate phone. Replacement of SIM can be detected, for example, by tracking both the IMSI and IMEI of the terminals that communicate with the trap BTSs. Typically, the IMSI is uniquely associated with the SIM, and the IMEI is uniquely associated with the terminal irrespective of the SIM. Therefore, if the activity profile of a given terminal (IMEI) indicates that the terminal operates using different IMSIs, this behavior may be regarded as suspicious.

Further alternatively, processor 52 may define any other suitable criteria, and apply the criteria to any other suitable information provided by the dummy network, in order to identify terminals that are operated illegitimately by prisoners.

In some embodiments, processor 52 adapts the identification criteria over time. For example, the processor may accept feedback from an operator, as to whether or not a terminal that was identified as illegitimate actually proved to be illegitimate. Additionally or alternatively, the operator may provide feedback information on illegitimate terminals that were not identified by the profiling system. Processor 52 may use this feedback information to refine and adapt its identification criteria.

In some embodiments, profiling system 44 holds a predefined list of terminals that are known to be legitimate ("white list"), and/or a predefined list of terminals that are known to be illegitimate ("black list"). For example, the white list may contain phones that are known to belong to prison staff and/or to individuals who work or live adjacently to the prison vicinity. The black list may contain, for example, phones that were identified using other means as belonging to prisoners. In some embodiments, processor 52 may identify illegitimate and/or legitimate terminals by querying one or both lists.

As noted above, in some embodiments processor 52 adapts the identification criteria over time based on operator feedback. Additionally or alternatively, processor 52 may adapt the identification criteria automatically by using the white list and/or black list as training sets. Automatic adaptation processes of this sort may use methods such as neural networks (or similar data mining methods) to identify suspicious terminals as opposed to innocent handsets.

Figure 2:
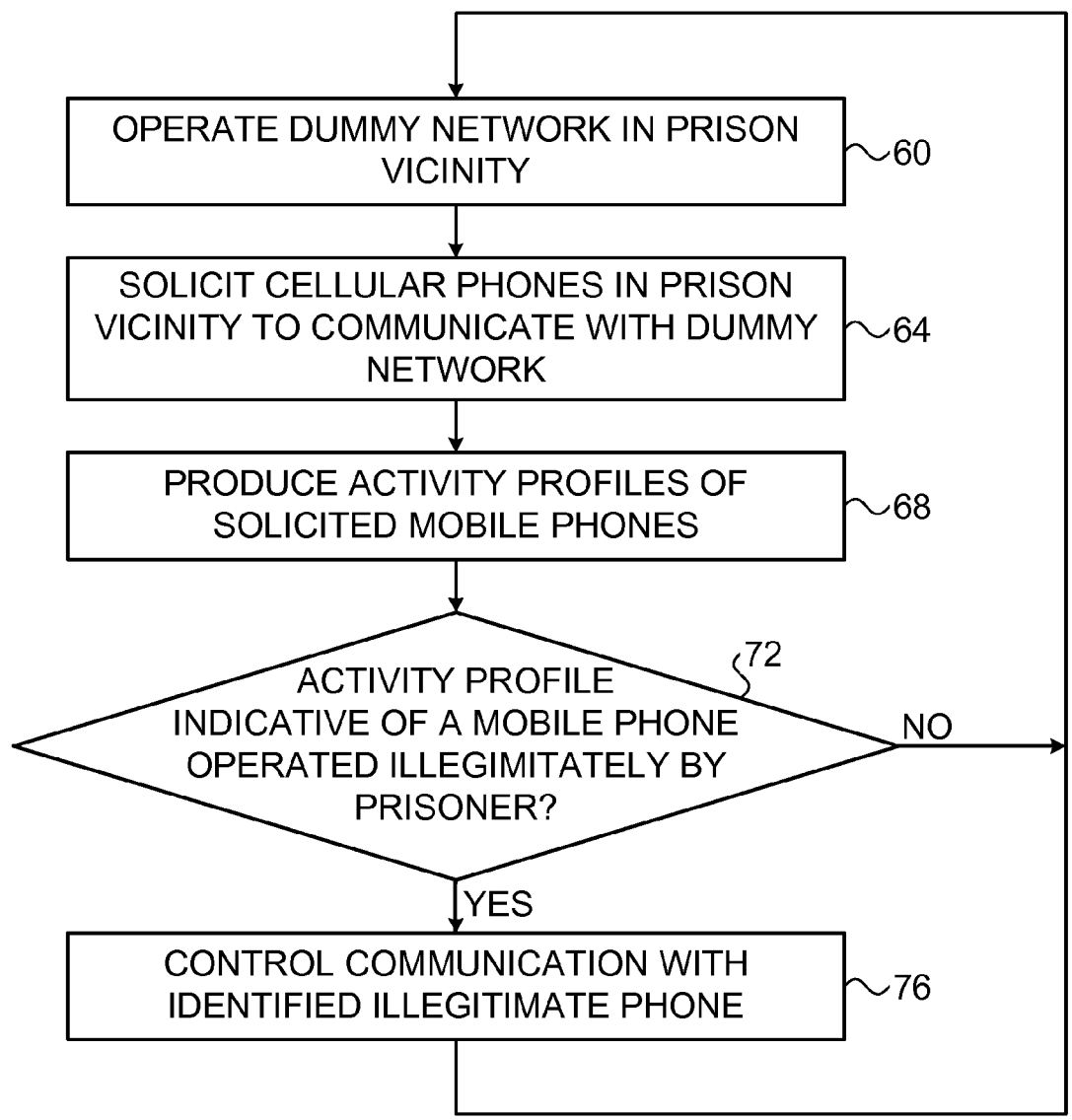
FIG. 2 is a flow chart that schematically illustrates a method for identifying mobile communication terminals in a prison environment, in accordance with an embodiment of the present disclosure.

FIG. 2 is a flow chart that schematically illustrates a method for identifying mobile communication terminals in a prison environment, in accordance with an embodiment of the present disclosure. The method begins by operating a dummy communication network, comprising one or more trap BTSs 40, in the vicinity of prison 24, at a dummy network operation step 60. Trap BTSs 40 solicit communication terminals in the prison vicinity to communicate with the dummy network, at a solicitation step 64. Based on information extracted from the communication with the dummy network, processor 52 produces respective activity profiles of the solicited communication terminals, at a profiling step 68.

Processor 52 checks whether any of the activity profiles is indicative of a terminal that is operated illegitimately by a prisoner, at a terminal identification step 72. Typically, processor 52 identifies illegitimate terminals by applying one or more criteria, such as the example criteria described above, to the activity profiles. If a given profile matches one of the criteria, it is regarded as potentially illegitimate.

If none of the activity profiles is found to indicate an illegitimate terminal, the method loops back to step 60 above. If, on the other hand, processor 52 identifies an illegitimate communication terminal, the processor takes action so as to control subsequent communication with the identified terminal.

For example, processor 52 may send an alert or alarm to an operator. As another example, the processor may instruct the trap BTSs to retain the identified terminal in the dummy network (i.e., not allow hand-off to any other network), so as to prevent the identified terminal from communicating. As yet another example, the processor may allow the identified terminal to perform the requested communication via the dummy network, in order to eavesdrop or otherwise monitor the communication. Further alternatively, processor 52 may control the communication with the identified illegitimate terminal in any other suitable way.

In some embodiments, processor 52 further classifies the solicited communication terminals as illegitimate, legitimate, or legitimate and belonging to prison staff. In an example embodiment, the processor may differentiate between legitimate and illegitimate terminals using the criteria described above. The processor can then sub-classify the legitimate terminals using a predefined list of terminals that are known to belong to prison staff.

Each class of terminals can be treated differently by the system. For example, legitimate terminals that do not belong to prison staff (e.g., terminals operated by visitors or other innocent individuals in the prison vicinity) can be handed-off to a neighboring public network and allowed to continue communicating. Illegitimate terminals can be retained in the dummy network and blocked or eavesdropped, as explained above. Terminals operated by prison staff can be provided with private network services by the dummy network.

Monitoring Communication Terminals by
Interfacing with Public Network

In the example embodiments described above, communication terminals in the vicinity of the restricted environment (e.g., prison) are monitored using a dummy communication network. In alternative embodiments, however, the communication terminals can be monitored using any other suitable means. For example, in some embodiments, interface 48 connects profiling system 44 directly to public communication network 36 (e.g., cellular network) over which the terminals communicate. In these embodiments, the profiling system obtains from the public network information regarding the monitored communication terminals, and constructs the activity profiles of the terminals using this information.

In these embodiments, interface 48 may comprise one or more network probes, which are connected to the infrastructure of the public network's service provider. In an example implementation, the service provider may define the cells or base stations that cover the vicinity of the restricted environment as a separate Location Area Code (LAC). Network events that occur in this LAC are provided to the profiling system through the network probes. Using this technique, terminals that are located in the area-of-interest can be readily identified and their activity reported to the profiling system. In an alternative embodiment, interface 48 comprises one or more off-the-air probes, which monitor terminal activity in the vicinity of the restricted environment.

As explained above, system 20 may control communication with the monitored terminals based on their classification (e.g., legitimately- or illegitimately-operated). When system 20 is connected to the public network, controlling the communication with the monitored terminals (e.g., intercepting, blocking or allowing communication) can be performed using the interface with the service provider's infrastructure.

This sort of interfacing can be performed using various interfaces, such as, for example, the Communications Assistance for Law Enforcement Act (CALEA) interface or the European Telecommunications Standards Institute (ETSI) Lawful Interception (LI) interface. The ETSI LI interface is specified in an ETSI Technical Specification entitled "Lawful Interception (LI); Retained Data Handling; Handover Interface for the Request and Delivery of Retained Data," TS 102 657, version 1.4.1, December, 2009, which is incorporated herein by reference.

Although the embodiments described herein mainly address identifying illegitimate communication terminals operated by prisoners in a prison environment, the principles of the present disclosure can also be used in other environment that impose restrictions on the use of communication terminals. The disclosed techniques are particularly suitable for environments in which the restrictions are imposed selectively, i.e., only on certain terminals or users and not on others. Restricted environments may comprise, for example, highly-secure environments (e.g., military bases and strategic installations) in which it is desirable to control which terminals are permitted to communicate and when.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
   monitoring mobile communication terminals, which are located in a vicinity of a restricted environment;
   producing, using a processor of a computing device, respective activity profiles of the monitored communication terminals; and
   based on the activity profiles, identifying a communication terminal that is operated illegitimately in the restricted environment,
   wherein identifying the communication terminal comprises applying an identification criterion to an activity profile of the communication terminal, and identifying the communication terminal as operating illegitimately responsively to meeting the criterion,
   wherein identifying the communication terminal comprises applying an identification criterion to an activity profile of the communication terminal, and identifying the communication terminal as operating illegitimately responsively to meeting the criterion, and
   wherein the identification criterion regards the communication terminal as illegitimate when the communication terminal communicates in a repetitive pattern.

2. The method according to claim 1, wherein monitoring the communication terminals comprises operating a dummy communication network, comprising one or more base stations, in the vicinity of the restricted environment, and soliciting the communication terminals to communicate with the dummy communication network.

3. The method according to claim 1, wherein monitoring the communication terminals comprises interfacing with a public communication network over which the communication terminals communicate.

4. The method according to claim 1, wherein the restricted environment comprises a prison, and wherein the identified communication terminal is operated illegitimately by a prisoner.

5. The method according to claim 1, and comprising controlling communication with the identified communication terminal.

6. The method according to claim 1, wherein identifying the communication terminal comprises classifying at least some of the monitored communication terminals to a first class of illegitimately-operated communication terminals, a second class of legitimately-operated communication terminals belonging to staff of the restricted environment, and a third class of legitimately-operated communication terminals that do not belong to the staff.

7. The method according to claim 6, wherein classifying the monitored communication terminals comprises associating a given monitored communication terminal with one of the classes, and controlling communication with the given communication terminal based on a class with which it is associated.

8. The method according to claim 7, wherein controlling the communication comprises blocking the communication when the given communication terminal is associated with the first class, and allowing the communication when the given communication terminal is associated with one of the second and third classes.

9. The method according to claim 7, wherein controlling the communication comprises providing a private network service to the given communication terminal when the given communication terminal is associated with the second class.

10. The method according to claim 1, wherein monitoring the communication terminals comprises operating a dummy communication network in the vicinity of the restricted environment and soliciting the communication terminals to communicate with the dummy communication network, and wherein the identification criterion regards the communication terminal as legitimate when the communication terminal is handed-off to the dummy communication network from another network, and as illegitimate when the communication terminal is switched-on in the dummy communication network.

11. The method according to claim 1, and comprising accepting feedback, which indicates whether the identified communication terminal is illegitimate, and adapting the identification criterion responsively to the feedback.

12. The method according to claim 1, wherein identifying the communication terminal comprises holding at least one list selected from a group of lists consisting of a white list containing communication terminals that are known to be legitimately-operated and a black list containing communication terminals that are known to be illegitimately-operated, and identifying the communication terminal using the at least one list.

13. The method according to claim 11, wherein identifying the communication terminal comprises applying an identification criterion to an activity profile of the communication terminal, and comprising automatically adapting the criterion by using the at least one list as a training set.

14. Apparatus, comprising:
an interface, which is configured to communicate with a communication network so as to monitor mobile communication terminals that communicate over the communication network and are located in a vicinity of a restricted environment; and
a processor, which is configured to receive information regarding the monitored communication terminals from the communication network via the interface, to produce respective activity profiles of the monitored communication terminals using the information, and to identify, based on the activity profiles, a communication terminal that is operated illegitimately in the restricted environment,
wherein to identify the communication terminal comprises applying an identification criterion to an activity profile of the communication terminal, and identifying the communication terminal as operating illegitimately responsively to meeting the criterion, and
wherein the identification criterion regards the communication terminal as illegitimate when the communication terminal communicates in a repetitive pattern.

15. The apparatus according to claim 14, wherein the communication network comprises a dummy communication network that includes one or more base stations, operates in the vicinity of the restricted environment and solicits the communication terminals to communicate with the dummy communication network.

16. The apparatus according to claim 14, wherein the communication network comprises a public communication network over which the communication terminals communicate.

17. The apparatus according to claim 14, wherein the restricted environment comprises a prison, and wherein the identified communication terminal is operated illegitimately by a prisoner.

* * * * *